United States Patent
Jyouza et al.

(10) Patent No.: US 9,908,372 B2
(45) Date of Patent: Mar. 6, 2018

(54) PNEUMATIC TIRE

(75) Inventors: Ayako Jyouza, Kanagawa (JP); Atsushi Tanno, Kanagawa (JP)

(73) Assignee: THE YOKOHAMA RUBBER CO., LTD., Tokyo (JP)

(*) Notice: Subject to any disclaimer, the term of this patent is extended or adjusted under 35 U.S.C. 154(b) by 237 days.

(21) Appl. No.: 14/119,081

(22) PCT Filed: Apr. 11, 2012

(86) PCT No.: PCT/JP2012/059888
§ 371 (c)(1),
(2), (4) Date: Nov. 20, 2013

(87) PCT Pub. No.: WO2012/160896
PCT Pub. Date: Nov. 29, 2012

(65) Prior Publication Data
US 2014/0144210 A1 May 29, 2014

(30) Foreign Application Priority Data
May 23, 2011 (JP) ................... 2011-114609

(51) Int. Cl.
*F16B 21/08* (2006.01)
*B60C 23/00* (2006.01)
(Continued)

(52) U.S. Cl.
CPC .......... *B60C 23/00* (2013.01); *B29D 30/0061* (2013.01); *B60C 23/0493* (2013.01);
(Continued)

(58) Field of Classification Search
CPC ..................................................... B60C 23/00
(Continued)

(56) References Cited

U.S. PATENT DOCUMENTS 6,217,683 B1 4/2001 Balzer et al.
2003/0155054 A1 8/2003 Bell
(Continued)

FOREIGN PATENT DOCUMENTS

JP 52-66876 5/1977
JP 54-133268 9/1979
(Continued)

OTHER PUBLICATIONS

International Search Report dated Jul. 24, 2012 filed in PCT/JP2012/059888.

*Primary Examiner* — Peter Macchiarolo
*Assistant Examiner* — Alexander Mercado
(74) *Attorney, Agent, or Firm* — Rankin, Hill & Clark LLP (57) ABSTRACT

A pneumatic tire includes: one fastener among a pair of mechanical fasteners that are separated into two in a region of a range from a bead tip to the maximum width position of a tire at a tire inner surface; and an electronic circuit device with another fastener that is to be engaged with the one fastener, the electronic circuit device being secured to the tire inner surface by fitting the two fasteners. In the pneumatic tire with such a configuration, even in the case where the electronic circuit device is mounted on the tire inner surface and liquid such as puncture repair liquid is injected in the tire at puncture, there is no possibility of damaging the electronic circuit device due to adhesion of the liquid to the electronic circuit device such as an air pressure sensor.

14 Claims, 5 Drawing Sheets

(51) Int. Cl.
*B60C 23/04* (2006.01)
*B29D 30/00* (2006.01)

(52) U.S. Cl.
CPC ............... *B29D 2030/0072* (2013.01); *B29D 2030/0077* (2013.01); *F16B 21/08* (2013.01); *Y10T 24/45* (2015.01)

(58) Field of Classification Search
USPC ............................................. 73/37; 24/572.1
See application file for complete search history.

(56) References Cited

U.S. PATENT DOCUMENTS

| | | |
|---|---|---|
| 2004/0154389 A1 | 8/2004 | Okubo et al. |
| 2006/0260726 A1 | 11/2006 | Bell |
| 2007/0240502 A1 | 10/2007 | Morinaga et al. |
| 2008/0246588 A1* | 10/2008 | Shimura ............... B60C 13/001 340/10.1 |
| 2009/0173422 A1* | 7/2009 | Utsumi ............... B60C 23/0493 152/510 |
| 2010/0108222 A1 | 5/2010 | Bell |
| 2011/0113630 A1 | 5/2011 | Bell |

FOREIGN PATENT DOCUMENTS

| | | |
|---|---|---|
| JP | 2002502765 | 1/2002 |
| JP | 2004-196023 | 7/2004 |
| JP | 2004-245622 | 9/2004 |
| JP | 2005517581 | 6/2005 |
| JP | 2005-212562 | 8/2005 |
| JP | 2005-343281 | 12/2005 |
| JP | 2006044503 | 2/2006 |
| JP | 2006-056443 | 3/2006 |
| JP | 2007-002907 | 1/2007 |
| JP | 2007-326536 | 12/2007 |
| JP | 2008-230411 | 10/2008 |
| JP | 2010167839 | 8/2010 |
| JP | 2011-114609 | 6/2011 |
| JP | 2012-025318 | 2/2012 |
| JP | 2012-025319 | 2/2012 |
| WO | 03/070496 | 8/2003 |

* cited by examiner

PNEUMATIC TIRE

TECHNICAL FIELD

The present invention relates to a pneumatic tire. More specifically, the present invention relates to a pneumatic tire where an electronic circuit device is mounted on an inner surface by a novel method.

BACKGROUND ART

In recent years, disposition of objects having various functions on an inner surface of a pneumatic tire and methods for the disposition have been variously examined.

An attaching method, for example, has been proposed in which tire tags (radio frequency identification tags), chips, or the like are attached to an inner liner or the like of a green tire using a so-called surface fastener such as a hook-and-loop fastener or a hook-and-hook fastener (Patent Document 1).

Additionally, a pneumatic tire has been proposed in which a surface fastener is vulcanization bonded to a region corresponding to a tread of a tire inner surface, and a noise absorbing material is attached to the tire inner surface via the surface fastener (Patent Document 2).

The attaching methods using the surface fasteners proposed in these Patent Document 1 and Patent Document 2 are preferable in that relatively strong engagement force is achieved when attached. The methods are also preferable in that engagement on a surface can be achieved without slight misalignments when attaching becoming a problem.

However, with the attaching methods using surface fasteners proposed in the patent documents, a state in which the individual engaging elements of the surface fastener are engaged is not ideal due to such as the curved inner circumferential surface of the pneumatic tire being an annular, curved surface, thus the edge portions, mid-portion, or similar portion may become partially raised. Accordingly, an amount of the obtained engagement force may vary (positional variation within the tire and variation from tire to tire). As a result, in some cases, the expected engagement force was not able to be obtained. In these methods, repetitive deformation and compression are performed over an extended period of time caused by rolling at high speeds in a state of relatively elevated temperatures. This may cause partial physical deterioration and deterioration/degradation over time of the engagement force of an entirety of the surface fastener accompanying the progression of the partial physical deterioration. This may lead to cases in which difficulties have been met in maintaining a desired engagement force over an extended period of time.

To solve the problems, the inventors of the present invention have previously proposed a pneumatic tire that includes one fastener among a pair of mechanical fasteners that can be separated into two at a tire inner surface (Japanese Laid-Open Patent Publication No. 2010-167839). In the method for attaching an object employed for the pneumatic tire, the obtained engagement force is especially large, and an amount of the obtained engagement force hardly varies (positional variation within the tire and variation from tire to tire). Additionally, in the attaching method, deterioration and degradation over time of the engagement force is less likely to occur even under as sever usage condition of repetitive deformation and compression over an extended period of time caused by fire rolling at high speeds in a state of relatively elevated temperatures. This allows maintaining a desired engagement force over long period.

Here, a mechanical fastener means a fastener configured with a pair of fasteners. The pair of fasteners can be separated into two fasteners. The pair of fasteners can be physically re-engaged. This engaging and separating can be freely repeated.

A typical mechanical fastener is those called as hooks or snaps. The mechanical fastener is generic term for products in, for example, the clothing industry. More specifically, the mechanical fasteners generally include snap buttons, ring snaps, ring hooks. American snaps, American hooks, eyelet hooks, spring books, jumper hooks, and similar hooks. Such mechanical fasteners differ from so-called "surface fastener" in that while an area of the engaging part of a surface fastener is unlimited in the entire area. So to speak, mechanical fasteners are point fasteners with small-area engaging part (e.g. preferably from about 1 to 115 $mm^2$ and more preferably from about 4 to 90 $mm^2$). In other words, even when engaged at a small area of, for example, from about 1 to 115 $mm^2$, due to a mechanical male-female structure or the like, the mechanical fasteners achieve strong engaging. Thus, a conventional structure for the mechanical fastener may be used. The mechanical fastener can be formed from materials such as metals, rubbers, synthetic resins, and the like. The method using the mechanical fastener is excellent in, for example, an amount of obtained engagement force, variation of the amount of obtained engagement force, and certainty of the engagement operation.

Figure 5:
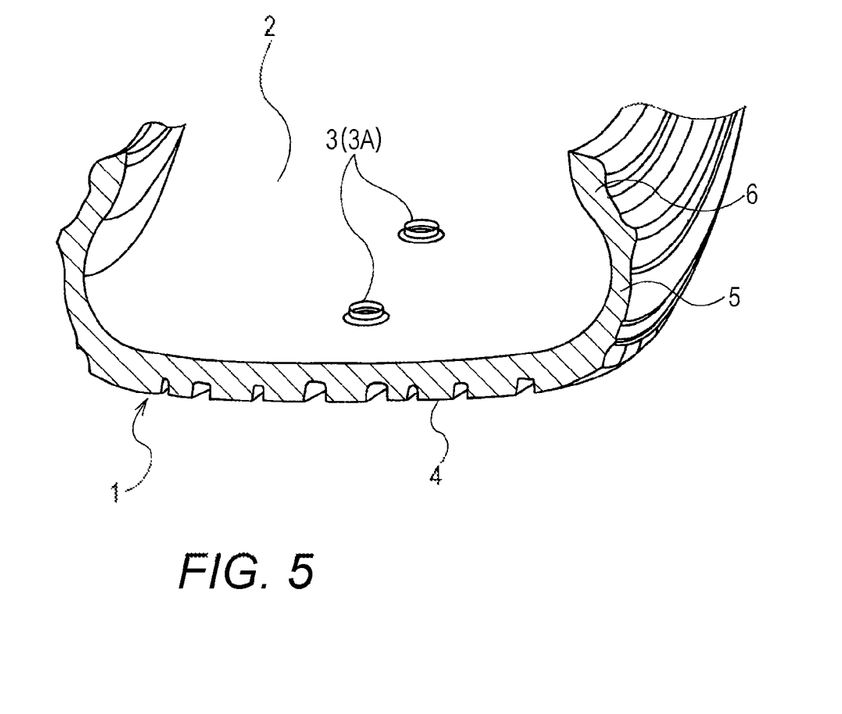
FIG. 5 is a partial perspective cross-sectional view illustrating a pneumatic tire with fasteners that has been previously proposed by the inventors of the present invention.
Figure 6A:
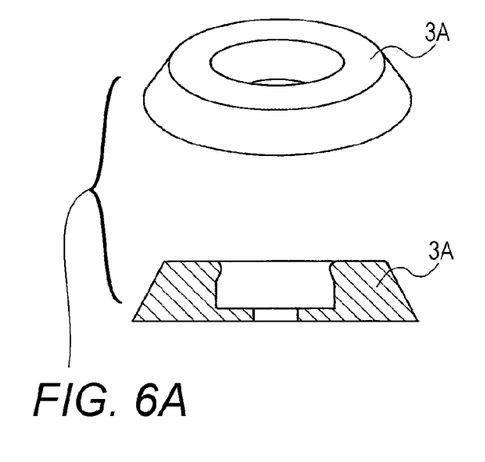
FIGS. 6A and 6B illustrate fasteners 3A and 3B that are each paired.
Figure 6B:
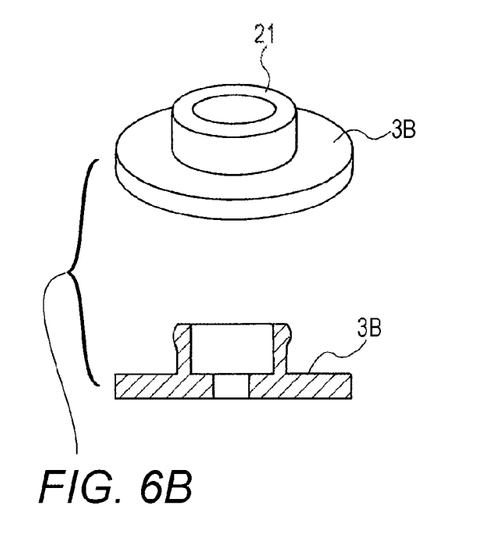
Figure 6C:
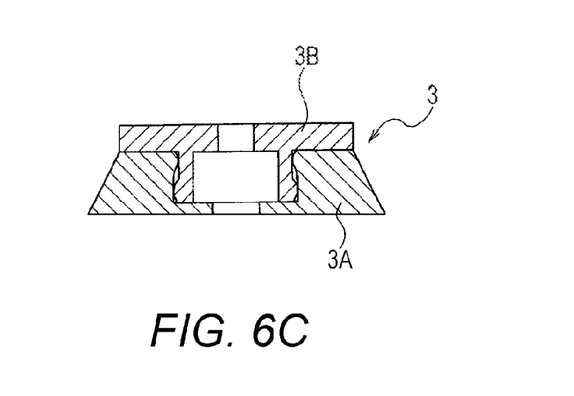

One fastener among the mechanical fasteners mounted on the tire inner circumferential surface is shown in FIG. 5. In FIG. 5, the tire inner surface 2 of a pneumatic tire 1 includes a one fastener 3 (3A) among a pair of mechanical fasteners that can be separated into two fasteners. Reference numeral 4 denotes a tread, reference numeral 5 denotes a sidewall, and reference numeral 6 denotes a bead. The mechanical fastener 3 includes a pair of fasteners. The pair of fasteners includes the depressed-shaped or the female-shaped fastener 3A as shown in FIG. 6A and the convex-shaped or a male-shaped fastener 3B as shown in FIG. 6B. Engaged states of the fasteners are shown in FIG. 6C.

In the tire with a structure where the one fastener (3A) among the pair of mechanical fasteners is included at the tire inner surface, any given object with another fastener (3B) is engaged with the paired fastener (3A) on the tire inner surface side. Accordingly, the any given object is disposed at the inner surface of the pneumatic tire.

However, the disposition method or a disposition method using the above-described surface fastener has the following problem. That is the electronic circuit device such as an air pressure sensor may be mounted on the pneumatic tire by these methods. In this case, injection of liquid such as puncture repair liquid in the tire at puncture may cause the liquid to adhere to the electronic circuit device such as the air pressure sensor, thus damaging the electronic circuit device.

CITATION LIST

Patent Literatures

Patent Document 1: JP-T-2005-517581
Patent Document 2 JP-A-2006-44503

DISCLOSURE OF THE INVENTION

Problems to be Solved by the Invention

To solve the above-described points, an object of the present invention is to provide a pneumatic tire as follows.

That is, with the pneumatic tire, even in the case where an electronic circuit device is mounted on a tire inner surface and liquid such as puncture repair liquid is injected in the tire at puncture, there is no possibility of damaging the electronic circuit device due to adhesion of the liquid to the electronic circuit device such as an air pressure sensor.

Solutions to the Problems

A pneumatic tire of the present invention that achieves the aforementioned object has the configuration described in (1) below.
(1) The pneumatic tire includes one fastener among a pair of mechanical fasteners that can be separated into two in a region of a range from a bead tip to a maximum width position of a tire at a tire inner surface. An electronic circuit device with another fastener that is to be engaged with the one fastener is secured to the tire inner surface by fitting the two fasteners.

The pneumatic tire according to the present invention preferably is configured as described in any of (2) to (7) below.
(2) The pneumatic tire described in (1), wherein a main body of the electronic circuit device is housed in a casing. The electronic circuit device is secured such that a distance between the tire inner surface and the casing excluding a fitting portion between a fastener on the casing side and a fastener on a tire inner surface side is 2 to 40 mm.
(3) The pneumatic tire described in (1) or (2), wherein a mechanism is disposed adjacent to a fitting portion. The mechanism is configured to prevent the electronic circuit device from rotating by sliding of both fasteners at a fitting portion where the two fasteners are fitted.
(4) The pneumatic tire described in any of (1) to (3), further including an identification mark being attached outside of the tire. The identification mark allows visually observing a position corresponding to a position where the one fastener disposed in the tire inner surface.
(5) The pneumatic tire described in any of (1) to (4), wherein the one fasteners are disposed at equal to or more than two locations to be equally spaced in a tire circumferential direction in the region of a range from the bead tip to a maximum width position of the tire at the tire inner surface.
(6) The pneumatic tire described in any of (1) to (5), wherein the electronic circuit device includes an air pressure sensor.
(7) The pneumatic tire described in (6), wherein the air pressure sensor is housed in a casing. The casing includes air holes at a surface on a side opposite to a surface with the fastener.

Effects of the Invention

According to the configuration (1), the following pneumatic tire is provided. That is, with the pneumatic tire, even in the case where electronic circuit device is mounted on a tire inner surface and liquid such as puncture repair liquid is injected in the tire at puncture, there is no possibility of damaging the electronic circuit device due to adhesion of the liquid to the electronic circuit device such as an air pressure sensor.

Especially, the pneumatic tire provided by the configuration (2) enhances the effect of the above-described configuration (1) with more certainty.

The pneumatic tire provided by the configuration (3) has the effect of the above-described configuration (1). Furthermore, the pneumatic tire is excellent in that a desired functionality of the electronic circuit device is accurately achieved.

The pneumatic tire provided by the configuration (4) has the effect of the above-described configuration (1). Furthermore, the pneumatic tire is excellent in that the electronic circuit device can be mounted at an optimum position considering positional relationship with another member, such as an air valve.

The pneumatic tire provided by the configuration (5) has the advantageous effect of the above-described configuration (1). Furthermore, the pneumatic tire is excellent in that the electronic circuit device can be mounted at an optimum position considering positional relationship with another member, such as an air valve.

The pneumatic tire provided by the configurations (6) or (7) includes an air pressure sensor as the electronic circuit device. The pneumatic tire more enhances the advantageous effect of the above-described configuration (1). Furthermore, the pneumatic tire can sense air pressure in the tire with higher accuracy and high durability. Objects, characteristics, situations, and advantageous effects of the embodiment of the present invention will be clarified by referring to the description and the accompanying drawings below.

BRIEF DESCRIPTION OF THE DRAWINGS

FIG. 2 is a drawing describing a pair of exemplary mechanical fasteners, which includes a mechanism to prevent the electronic circuit device from rotating, used for the pneumatic tire according to the present invention. FIG. 2C illustrates an engaged pair of fasteners. On an upper side of FIGS. 2A and 2B, external perspective views of the fasteners seen from obliquely upward are drawn. On a lower side of FIGS. 2A and 2B, cross-sectional views seen from the front direction are drawn.

FIG. 6 is a drawing describing a pair of exemplary mechanical fasteners that can be separated into two. These mechanical fasteners are applicable to a pneumatic tire with mechanical fasteners that has been previously proposed by the inventors of the present invention. The mechanical fasteners are also applicable to the pneumatic tire according to the present invention. FIG. 6C illustrates an engaged pair of fasteners. On an upper side of FIGS. 6A and 6B, external perspective views of the fasteners seen from obliquely upward are drawn. On a lower side of FIGS. 6A and 6B, cross-sectional views seen from the front direction are drawn.

DESCRIPTION OF EMBODIMENTS

A further detailed description will be given of a pneumatic tire according to an embodiment of the present invention.

Figure 1A:
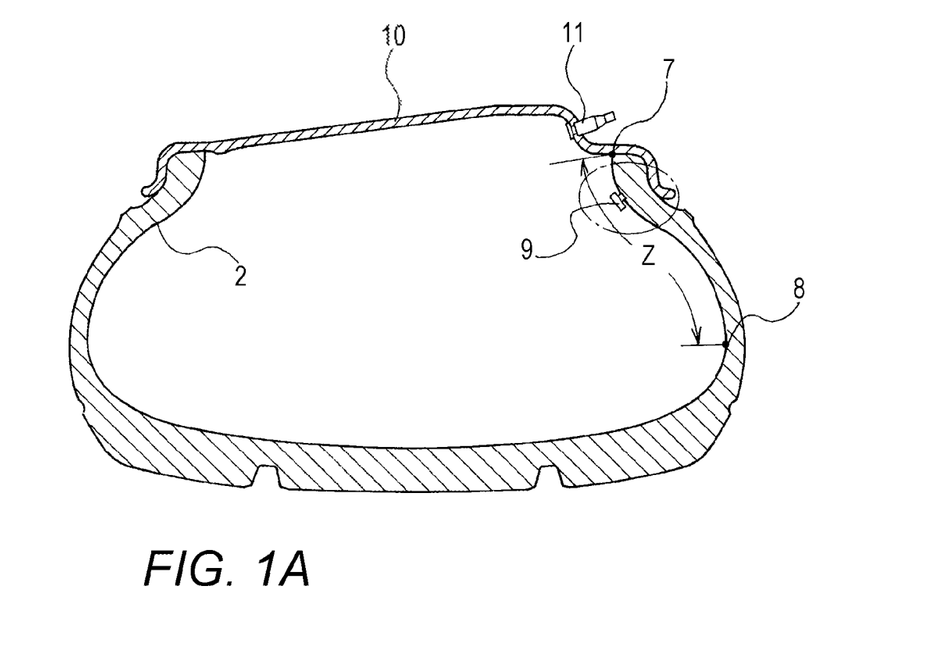
FIG. 1A is a schematic cross-sectional view in a tire meridional direction illustrating one embodiment of a pneumatic tire according to the present invention.
Figure 1B:
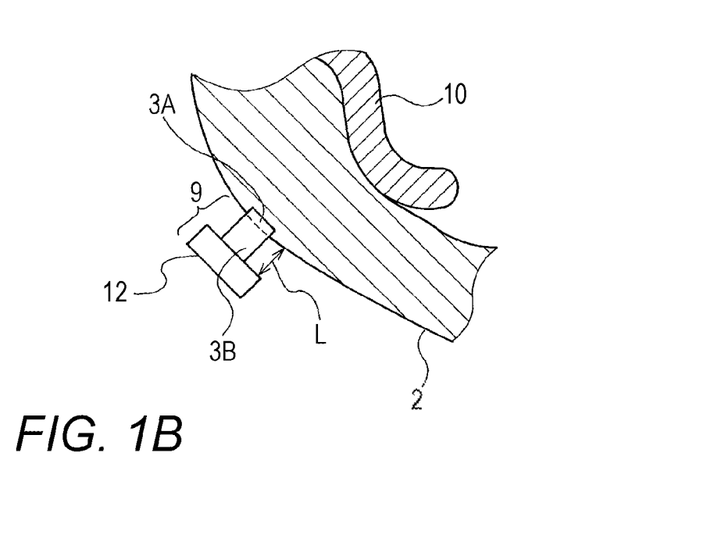
FIG. 1B is an enlarged cross-sectional view of a key section illustrating a vicinity of mounted portion of an electronic circuit device 9, which is indicated by an ellipse in FIG. 1A centered on the mounted portion.

The pneumatic tire according to one embodiment of the present invention includes one fastener 3A among a pair of mechanical fasteners 3 that can be separated into two as shown in FIGS. 1A and 1B. The fastener 3A is disposed in a region Z that is a range from a bead tip 7 to the maximum width position of tire 8 in a tire inner surface. The pneumatic tire features the following. An electronic circuit device 9 includes the other fastener 3B that engages the one fastener. The electronic circuit device 9 is secured to a tire inner surface 2 by fitting the two fasteners 3A and 3B.

This configuration uniquely determines a position where the electronic circuit device is disposed to a position of the fastener 3A disposed at the tire inner surface 2. In view of this, the position of the electronic circuit device is accurately determined. Generally, in engagement using a mechanical fastener, even if removal/mounting is repeated, reduction in an engagement force due to the removal/mounting is small or the engagement force is hardly reduced. This achieves stable mounting at an always accurate position. This allows desired functions of the electronic circuit device to be performed accurately with good durability.

In particular, the fastener 3A is disposed in the region Z, which is a range from the bead tip 7 to the maximum width position of tire 8 at the tire inner surface. Accordingly, compared with a case where the fastener 3A is mounted outside with respect to the maximum width position of tire 8, even if liquid such as puncture repair liquid is injected in the tire, the mounted electronic circuit device is hardly submerged in the liquid, thus the functionality is not degraded. In the region Z, a centrifugal force caused by rolling of the tire is the least at the bead. In view of this, an engagement force by mounting is not necessary to be strong so much. In this respect as well, the effects of the present invention can be optimally provided, advantageous of the present invention.

In the case where a plurality types of electronic circuit devices is mounted, a shape of the mechanical fastener is determined for each type of the electronic circuit device. Thus, only a pair of fasteners with matched shape is engaged with one another. In view of this, even if a single article or a plurality of articles are to be mounted, the type of the fastener is not mistaken due to, for example, mis-selection. This allows a member to be mounted to be installed as desired and at accurate installation position. This is considerably effective in that accurate installation without error is achieved in the case like electronic circuit devices to be mounted, such as sensors, differ depending on the type of the tire.

As shown in FIG. 1B, a casing 12 houses a main body of the electronic circuit device 9 (not shown). The electronic circuit device 9 is preferred to be secured by engagement of both the fasteners 3A and 3B such that a distance L becomes 2 to 40 mm. The distance L is a distance between the tire inner surface 2 and the casing 12 excluding an engaging portion between the fastener 3B on the casing 12 side and the fastener 3A on a tire inner surface side. This is to more effectively prevent liquid such as puncture repair liquid from flowing and adhering to the main body of the electronic circuit device upon injection in the tire at puncture. That is, in use of liquid such as the puncture repair liquid, the liquid is injected from, for example, an air valve 11 portion. This liquid may flow toward a tread side along the tire inner surface. Even in this case as well, according to knowledge of the inventors of the present invention, the liquid does not adhere to the electronic circuit device by being installed with the distance L of 2 to 40 mm. This allows desired functionality of the electronic circuit device 9 to be provided at better accuracy and better durability. The distance L can be obtained as desired by changing the shape or dimensions of the fasteners 3A and 3B or changing the shape or dimensions of the electronic circuit device 9. More preferably, the range of L is 3 to 20 mm.

It is preferred that a mechanism to prevent the electronic circuit device 3 from rotating by sliding of both the fasteners 3A and 3B at a fitting portion where the two fasteners 3A and 3B are fitted be disposed near the fitting portion. Prevention of rotation of the electronic circuit device 9 achieves transmission quality of a radio wave to be stabilized and increased in the case where, for example, the electronic circuit device 9 has a wireless transmission function.

An exemplary mechanism that prevents rotation of the mounted electronic circuit device 3 is described. In a case of a fastener with an engagement tube portion 21 (FIG. 6B), a non-circular-sectional shape of the engagement tube portion 21, such as an ellipse or a polygonal shape can be employed, as this mechanism. This prevents slide rotation.

Figure 2A:
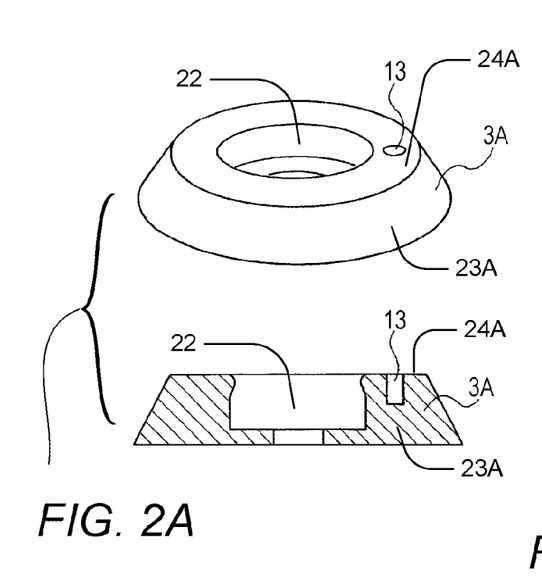
FIGS. 2A and 2B illustrate fasteners that are each paired.
Figure 2B:
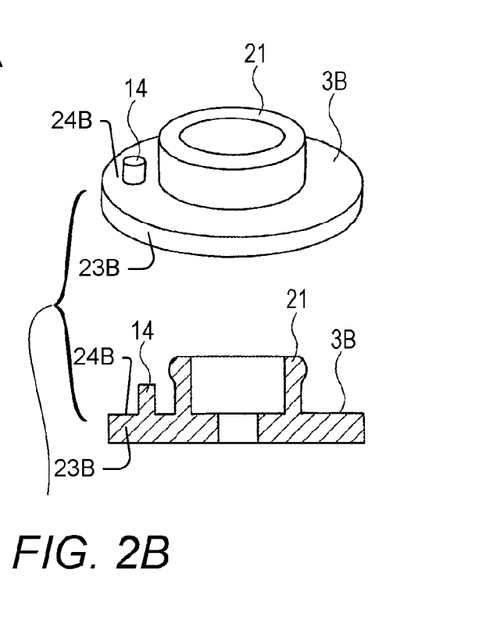
Figure 2C:
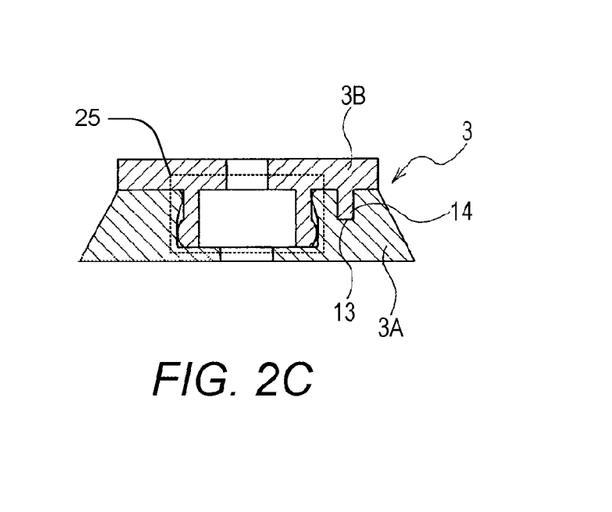

Alternatively, another exemplary mechanism that prevents the rotation is shown in FIG. 2. In this example, the depressed-shaped or the female-shaped fastener 3A includes a depressed portion 13. The convex-shaped or the male-shaped fastener 3B includes a convex portion 14. If the depressed portion 13 is not fitted to the convex portion 14 at engagement of the fasteners 3A and 3B, the fasteners 3A and 3B are failed to be engaged. While the depressed portion 13 fits the convex portion 14, the fasteners 3A and 3B cannot relatively rotate with one another. The depressed portion 13 and the convex portion 14 need not to be disposed at the main bodies of the fasteners 3A and 3B. Pedestal portions may be disposed at the depressed portion 13 and the convex portion 14.

Figure 3A:
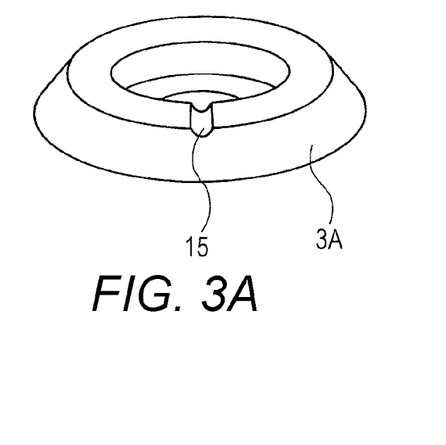
FIGS. 3A and 3B are drawings describing another exemplary pair of mechanical fasteners, which includes a mechanism to prevent the electronic circuit device from rotating, used for the pneumatic tire according to the present invention.
Figure 3B:
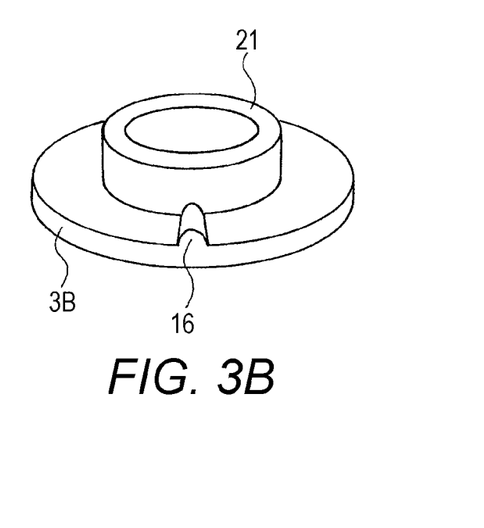
Figure 4A:
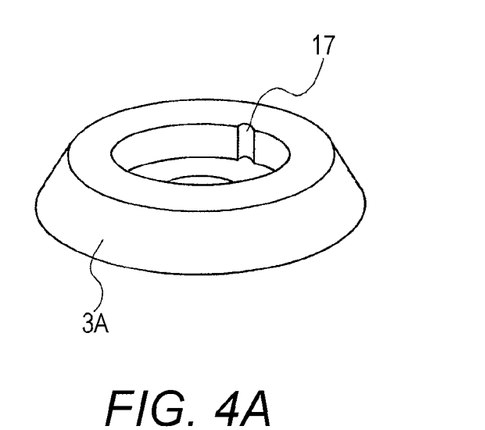
FIGS. 4A and 4B are drawings describing yet another exemplary pair of mechanical fastener, which includes a mechanism to prevent the electronic circuit device from rotating used for the pneumatic tire according to the present invention.
Figure 4B:
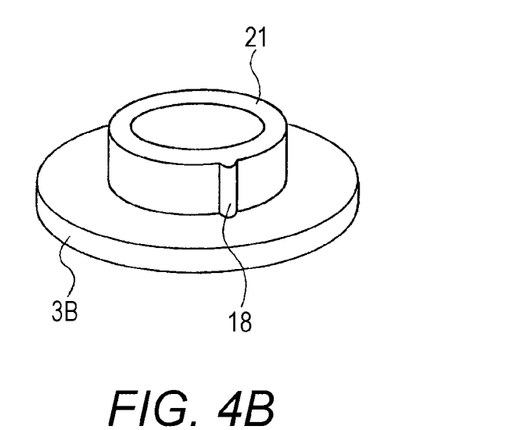

In FIGS. 3 and 4, other exemplary mechanisms to prevent the rotation are respectively shown. In the example shown in FIG. 3, the pair of fasteners 3A and 3B include a horizontal groove 15 and a horizontal convex 16 at the engagement tube portion 21 and similar portion. Alternatively, in the example shown in FIG. 4, the pair of fasteners 3A and 3B include a vertical groove 17 and a vertical convex 18.

It is preferred that an identification mark is attached outside of the tire. The identification mark allows visually observing a position corresponding to a position where the one fastener 3A is disposed in the tire inner surface. To prevent adverse effect by, for example, the puncture repair liquid, such as malfunction of the electronic circuit device, the following is effective and preferred. A position of an air valve, which injects the puncture repair liquid, and a position where the electronic circuit device is to be installed are shifted one another in a tire circumferential direction. With the above-described configuration, the positional relationship of these members can be visually observed easily from the outside of the tire by, for example, an operator. A specific shifting amount is preferably a phase angle in the circumferential direction of equal to or more than 45° placing a rotational center of the tire as a center point. The identification mark, which allows visual observation of the position where the electronic circuit device is to be installed, is attached outside of the tire. This allows the operator to optimally adjust an installation position of the air valve at the above-described phase angle for installation during a rim assembly operation.

It is also preferred that the one fasteners 3A are disposed at equal to or more than two locations to be equally spaced in the region Z, which is a range from the bead tip to the maximum width position of the tire at the tire inner surface, in the tire circumferential direction.

The reason is as follows. Usually, a rim is assembled to the tire such that the light point mark matches an installation position of the air valve. In view of this, disposing the fasteners 3A at equal to or more than two locations allows selecting optimum mounting positions of the fasteners 3A away of the air valve. In the case where at plurality pieces of the fasteners 3A is installed in the tire circumferential direction, to avoid degradation of mass balance of the tire, disposing the fasteners 3A at equal intervals in the tire circumferential direction is preferred. In the case where, for example, the installation positions of the fasteners 3A are two, the positions are preferred to be shifted approximately 180° positions and opposed to one another. In the case where the installation positions of the fasteners 3A are three, the positions are preferred to be away approximately 120° from each other.

The fasteners 3A may be installed at the beads on both sides sandwiching the tire center. The air valve is often installed at a position one-sided toward a wheel width direction. In the above-described configuration, in assembly of the tire and the wheel, the fastener 3A can be selected such that the electronic circuit device may be installed on a side where the air valve is absent.

Alternatively, the one fasteners 3A may be disposed at equal to or more than two different locations along the tire radial direction in the region Z, which is a range from the bead tip to the maximum width position of the tire at the tire inner surface. This allows selecting the fastener 3A such that the electronic circuit device may be installed at more appropriate position in the tire radial direction.

In the present invention, it is especially effective and preferable that the electronic circuit device be an air pressure sensor. The air pressure sensor housed in a casing requires an air hole. In view of this, in the air pressure sensor, effects of the present invention, which are prevention of flow of liquid into the casing and submergence of the electronic circuit device, are most evident.

From these aspects, when the electronic circuit device is the air pressure sensor in the present invention, it is preferred that the air pressure sensor be housed in the casing and the casing has the air holes at a surface on a side opposite to the surface with the fastener 3B. Disposing the air holes at the surface on the side opposite to the surface more effectively prevents entrance of liquid to the air holes. In view of this, the effects of the present invention can be more highly obtained.

"The maximum width position of the tire" in the present invention means the maximum width position in a meridional cross-section of a pneumatic tire. This pneumatic tire is mounted on an applicable rim specified in JATMA YEAR BOOK 2010 (standard of Japan Automobile Tyre Manufacturers Association). Air pressure of the pneumatic tire is 220 kPa, where no load is applied.

This application is based on Japanese Laid-Open Patent Publication No. 2011-114609 filed on May 23, 2011 in Japan by the applicant of this application, the disclosure of which is incorporated herein by reference in their entirety.

The above description of specific embodiment of the present invention is disclosed as illustrative. This does not intend to be exhaustive or limit the present invention to the described embodiments as they are. Many modifications and variations will be apparent to one of ordinary skill in the art in light of the above teachings.

DESCRIPTION OF REFERENCE SIGNS 1 pneumatic tire
2 tire inner surface
3 mechanical fastener
3A mechanical fastener (depressed-shaped or female-shaped fastener)
3B mechanical fastener (convex-shaped or male-shaped fastener)
4 tread
5 sidewall
6 bead
7 bead tip of tire inner surface
8 maximum width position of tire
9 electronic circuit device
10 rim
11 air valve
12 casing of electronic circuit device
13 depressed portion
14 convex portion
15 horizontal groove
16 horizontal convex
17 vertical groove
18 vertical convex
21 engagement tube portion
22 concave portion
23A, 23B pedestal portion
24A, 24B surface of pedestal portion
25 fitting portion
L distance between tire inner surface 2 and casing
Z region in range from bead tip 7 to maximum width position of tire 8 at tire inner surface 2

The invention claimed is:

1. A pneumatic tire, comprising:
a pair of mechanical fasteners comprising one fastener and another fastener, the one fastener capable of engaging with the another fastener, the pair of mechanical fasteners capable of being separated into the one fastener and the another fastener, the one fastener being disposed in a region of a range from a bead tip to a maximum width position of the pneumatic tire at a tire inner surface; and
an electronic circuit device comprising a casing and a main body housed in the casing, the casing being disposed on a bottom surface of the another fastener,
wherein the one fastener comprises a concave portion and the another fastener comprises an engagement tube portion which is fitted in the concave portion when the one fastener engages with the another fastener, or the another fastener comprises the concave portion and the one fastener comprises the engagement tube portion,
the pair of mechanical fasteners comprises a depressed portion and a convex portion capable of fitting to the depressed portion, the depressed portion and the convex portion being disposed at a place other than a fitting portion where the engagement tube portion is fitted in the concave portion, the depressed portion and the convex portion preventing the electronic circuit and the pair of mechanical fastener from sliding and rotating at the fitting portion, the depressed portion being depressed from a surface of a pedestal portion of the one fastener in a direction perpendicular to the surface of the pedestal portion of the one fastener and the convex portion being projected from a surface of a pedestal portion of the another fastener in a direction perpendicular to the surface of the pedestal portion of the another fastener, or the depressed portion being depressed from the surface of the pedestal portion of the another fastener in the direction perpendicular to the surface of the pedestal portion of the another fastener and the convex portion being projected from the surface of the pedestal portion of the one fastener in the direction perpendicular to the surface of the pedestal portion of the one fastener, the surface of the pedestal portion of the one fastener and the surface of the pedestal portion of the another fastener are parallel to the tire inner surface on which the one fastener is disposed, and the surface of the pedestal portion of the one fastener is in direct contact with the surface of the pedestal portion of the another fastener when the one fastener engages with the another fastener.

2. The pneumatic tire according to claim 1, wherein the pneumatic tire comprising a plurality of the one fasteners which are disposed at equal to or more than two locations to be equally spaced in a tire circumferential direction.

3. The pneumatic tire according to claim 1, comprising an identification mark that allows visually observing a position corresponding to a position where the one fastener is disposed in the tire inner surface, the identification mark being attached to a tire outside surface.

4. The pneumatic tire according to claim 1, wherein the electronic circuit device is to be installed at a position where the electronic circuit device is shifted from a position of an air valve in a circumferential direction by phase angle equal to or more than 45 degrees.

5. The pneumatic tire according to claim 1, wherein electronic circuit device includes an air pressure sensor.

6. The pneumatic tire according to claim 5, wherein
the air pressure sensor is housed in the casing, and
the casing includes air holes at a surface on a side opposite to the surface to which the another fastener is attached.

7. A pneumatic tire, comprising:
a tread formed on an outer periphery of the pneumatic tire;
a pair of mechanical fasteners comprising one fastener and another fastener, the one fastener capable of engaging with the another fastener, the pair of mechanical fasteners capable of being separated into the one fastener and the another fastener, the one fastener being disposed in a region of a range from a bead tip to a maximum width position of the pneumatic tire at a tire inner surface;
a valve disposed further away from the tread than the bead tip; and
an electronic circuit device comprising a casing and a main body housed in the casing, the casing being disposed on a bottom surface of the another fastener,
wherein when the one fastener engages with the another fastener, a gap between a surface of the casing closest to the tire inner surface and the tire inner surface is 2 to 40 mm, the gap preventing a liquid which flows from the valve toward the tread along the tire inner surface from flowing and adhering to the electronic circuit device,
the one fastener comprises a concave portion and the another fastener comprises an engagement tube portion which is fitted in the concave portion when the one fastener engages with the another fastener, or the another fastener comprises the concave portion and the one fastener comprises the engagement tube portion,
the pair of mechanical fasteners comprises a depressed portion and a convex portion capable of fitting to the depressed portion, the depressed portion and the convex portion being disposed at a place other than a fitting portion where the engagement tube portion is fitted in the concave portion, the depressed portion and the convex portion preventing the electronic circuit and the pair of mechanical fastener from sliding and rotating at the fitting portion, the depressed portion being depressed from a surface of a pedestal portion of the one fastener in a direction perpendicular to the surface of the pedestal portion of the one fastener and the convex portion being projected from a surface of a pedestal portion of the another fastener in a direction perpendicular to the surface of the pedestal portion of the another fastener, or the depressed portion being depressed from the surface of the pedestal portion of the another fastener in the direction perpendicular to the surface of the pedestal portion of the another fastener and the convex portion being projected from the surface of the pedestal portion of the one fastener in the direction perpendicular to the surface of the pedestal portion of the one fastener, the surface of the pedestal portion of the one fastener and the surface of the pedestal portion of the another fastener are parallel to the tire inner surface on which the one fastener is disposed, and the surface of the pedestal portion of the one fastener is in direct contact with the surface of the pedestal portion of the another fastener when the one fastener engages with the another fastener.

8. A pneumatic tire, comprising:
one fastener disposed in a region of a range from a bead tip to a maximum width position of the pneumatic tire at a tire inner surface;
another fastener being capable of engaging with the one fastener;
a casing configured to house a main body of an electronic circuit device, the casing being disposed on a bottom surface of the another fastener,
wherein when the one fastener engages with the another fastener, the casing is positioned in the pneumatic tire such that a surface of the casing closest to the tire inner surface is spaced apart from an innermost surface of the pneumatic tire by 2 to 40 mm,
the one fastener comprises a concave portion and the another fastener comprises an engagement tube portion which is fitted in the concave portion when the one fastener engages with the another fastener, or the another fastener comprises the concave portion and the one fastener comprises the engagement tube portion,
the pair of mechanical fasteners comprises a depressed portion and a convex portion capable of fitting to the depressed portion, the depressed portion and the convex portion being disposed at a place other than a fitting portion where the engagement tube portion is fitted in the concave portion, the depressed portion and the convex portion preventing the electronic circuit and the pair of mechanical fastener from sliding and rotating at the fitting portion, the depressed portion being depressed from a surface of a pedestal portion of the one fastener in a direction perpendicular to the surface of the pedestal portion of the one fastener and the convex portion being projected from a surface of a pedestal portion of the another fastener in a direction perpendicular to the surface of the pedestal portion of the another fastener, or the depressed portion being depressed from the surface of the pedestal portion of the another fastener in the direction perpendicular to the surface of the pedestal portion of the another fastener and the convex portion being projected from the surface of the pedestal portion of the one fastener in the direction perpendicular to the surface of the pedestal portion of the one fastener, the surface of the pedestal portion of the one fastener and the surface of the pedestal portion of the another fastener are parallel to the tire inner surface on which the one fastener is disposed, and the surface of the pedestal portion of the one fastener is in direct contact with the surface of the pedestal portion of the another fastener when the one fastener engages with the another fastener.

9. The pneumatic tire according to claim 1, wherein
the depressed portion is a horizontal groove disposed at the one fastener and the convex portion is a horizontal convex disposed at the another fastener, the horizontal groove extending in a direction parallel to an uppermost surface of the pedestal portion of the one fastener and the horizontal convex extending in a direction parallel to an uppermost surface of the pedestal of the another fastener, or
the depressed portion is the horizontal groove disposed at the another fastener and the convex portion is the horizontal convex disposed at the one fastener, the horizontal groove extending in the direction parallel to the uppermost surface of the pedestal portion of the another fastener and the horizontal convex extending in the direction parallel to the uppermost surface of the pedestal of the one fastener.

10. The pneumatic tire according to claim 7, wherein
the depressed portion is a horizontal groove disposed at the one fastener and the convex portion is a horizontal convex disposed at the another fastener, the horizontal groove extending in a direction parallel to an uppermost surface of the pedestal portion of the one fastener and the horizontal convex extending in a direction parallel to an uppermost surface of the pedestal of the another fastener, or
the depressed portion is the horizontal groove disposed at the another fastener and the convex portion is the horizontal convex disposed at the one fastener, the horizontal groove extending in the direction parallel to the uppermost surface of the pedestal portion of the another fastener and the horizontal convex extending in the direction parallel to the uppermost surface of the pedestal of the one fastener.

11. The pneumatic tire according to claim 8, wherein
the depressed portion is a horizontal groove disposed at the one fastener and the convex portion is a horizontal convex disposed at the another fastener, the horizontal groove extending in a direction parallel to an uppermost surface of the pedestal portion of the one fastener and the horizontal convex extending in a direction parallel to an uppermost surface of the pedestal of the another fastener, or
the depressed portion is the horizontal groove disposed at the another fastener and the convex portion is the horizontal convex disposed at the one fastener, the horizontal groove extending in the direction parallel to the uppermost surface of the pedestal portion of the another fastener and the horizontal convex extending in the direction parallel to the uppermost surface of the pedestal of the one fastener.

12. The pneumatic tire according to claim 1, wherein the pair of the mechanical fasteners is hooks or snaps.

13. The pneumatic tire according to claim 7, wherein the pair of the mechanical fasteners is hooks or snaps.

14. The pneumatic tire according to claim 8, wherein the pair of the mechanical fasteners is hooks or snaps.

* * * * *